US011696141B2

(12) United States Patent
Sun et al.

(10) Patent No.: US 11,696,141 B2
(45) Date of Patent: Jul. 4, 2023

(54) CONTROL APPARATUS AND METHOD FOR WIRELESS COMMUNICATION SYSTEM SUPPORTING COGNITIVE RADIO

(71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 45 days.

(21) Appl. No.: 17/120,297

(22) Filed: Dec. 14, 2020

(65) Prior Publication Data
US 2021/0099888 A1 Apr. 1, 2021

Related U.S. Application Data

(62) Division of application No. 15/510,752, filed as application No. PCT/CN2015/095761 on Nov. 27, 2015, now Pat. No. 10,911,959.

(30) Foreign Application Priority Data

Nov. 28, 2014 (CN) .......................... 201410709083.1

(51) Int. Cl.
H04W 16/04 (2009.01)
H04W 16/10 (2009.01)
(Continued)

(52) U.S. Cl.
CPC ......... H04W 16/10 (2013.01); H04M 11/005 (2013.01); H04W 16/14 (2013.01);
(Continued)

(58) Field of Classification Search
CPC .............. H04M 11/005; H04W 16/10; H04W 16/14; H04W 16/32; H04W 28/24; H04W 88/06;
(Continued)

(56) References Cited

U.S. PATENT DOCUMENTS 7,248,567 B2   7/2007   Desgagne et al.
7,707,328 B2   4/2010   Okajima et al.
(Continued)

FOREIGN PATENT DOCUMENTS

CN   102158294 A   8/2011
CN   103428724 A   12/2013
(Continued)

OTHER PUBLICATIONS

Mancuso et al.: "Protocol to Access White Space (PAWS) Database: Use Cases and Requirements; draft-ietf-paws-problem-stmt-usecasesrqmts-12.txt", Protocol to Access White Space (PAWS) Database: Use Cases and Requirements; draft-ietf-pawsproblem-stmt-usecases-rqmts-12.txt, Internet Engineering Task Force, IETF; Standardworkingdraft, Internet Society (ISOC) 4, Rue Des Falaises CH-1205 Geneva, Jan. 30, 2013 (Jan. 30, 2013), pp. 1-27, XP015089722.

(Continued)

Primary Examiner — Phuc H Tran
(74) Attorney, Agent, or Firm — Xsensus LLP

(57) ABSTRACT

A control apparatus and method for a wireless communication system supporting cognitive radio. The control apparatus includes an acquisition unit and a management unit. The acquisition unit is configured to acquire information about at least one factor capable of affecting performance of transferring an access request for a frequency spectrum resource by a communication apparatus, the access request being used for making a request to a device which controls the frequency spectrum allocation for allocating a frequency spectrum to the communication apparatus. The management unit is configured to receive the access request sent by the communication apparatus, and optimize a route for the access request of the communication apparatus according to the acquired factor in the case that the access request (Continued)

contains information indicating that the communication apparatus is a slave apparatus of another communication apparatus.

11 Claims, 9 Drawing Sheets

(51) Int. Cl.
*H04W 16/14* (2009.01)
*H04M 11/00* (2006.01)
*H04W 92/20* (2009.01)
*H04W 16/32* (2009.01)
*H04W 28/24* (2009.01)
*H04W 88/06* (2009.01)

(52) U.S. Cl.
CPC ............ *H04W 92/20* (2013.01); *H04W 16/32* (2013.01); *H04W 28/24* (2013.01); *H04W 88/06* (2013.01)

(58) Field of Classification Search
CPC ............... H04W 92/20; H01M 10/052; H01M 10/0525; H01M 2004/021; H01M 2004/027; H01M 2220/30; H01M 4/364; H01M 4/366; H01M 4/386; H01M 4/483; H01M 4/587; H01M 4/625
See application file for complete search history.

(56) References Cited

U.S. PATENT DOCUMENTS

| | | | |
|---|---|---|---|
| 8,483,058 B2 | 7/2013 | Lee et al. | |
| 9,426,826 B1* | 8/2016 | Oroskar | H04W 74/0833 |
| 9,684,601 B2 | 6/2017 | Böttcher et al. | |
| 10,292,052 B2 | 5/2019 | Wang | |
| 2005/0198437 A1 | 9/2005 | Mukherjee | |
| 2009/0074032 A1 | 3/2009 | Callaway, Jr. et al. | |
| 2010/0083247 A1 | 4/2010 | Kanevsky et al. | |
| 2010/0197332 A1 | 8/2010 | Kyperountas et al. | |
| 2010/0238798 A1 | 9/2010 | Ahuja et al. | |
| 2011/0106952 A1* | 5/2011 | Doppler | H04W 72/0406 709/226 |
| 2012/0083303 A1 | 4/2012 | Min et al. | |
| 2013/0304991 A1 | 11/2013 | Bottcher et al. | |
| 2013/0336199 A1 | 12/2013 | Schwartz et al. | |
| 2014/0213313 A1 | 7/2014 | Ue et al. | |
| 2014/0274090 A1* | 9/2014 | Mitchell | H04W 24/02 455/452.1 |
| 2014/0307552 A1 | 10/2014 | Elsherif et al. | |
| 2014/0321423 A1* | 10/2014 | Kalhan | H04W 72/1215 370/329 |
| 2015/0043475 A1* | 2/2015 | Kim | H04L 5/0037 370/329 |
| 2015/0046662 A1 | 2/2015 | Heinrich et al. | |
| 2015/0072702 A1* | 3/2015 | Chun | H04W 16/14 455/454 |
| 2015/0365848 A1* | 12/2015 | Sawai | H04W 36/0055 455/436 |
| 2016/0212760 A1 | 7/2016 | Iwai | |
| 2017/0238187 A1 | 8/2017 | Wang | |
| 2018/0084429 A1 | 3/2018 | Guo et al. | |

FOREIGN PATENT DOCUMENTS

| | | |
|---|---|---|
| WO | 2013/133502 A1 | 9/2013 |
| WO | 2014/148069 A1 | 9/2014 |

OTHER PUBLICATIONS

Mark Austin (Ofcom): "Ofcom consultation: Digital Dividend—Cognitive Access ; 18-09-0035-00-0000-ofcom-consultation-digital-dividend-cognitive-access", IEEE DRAFT;18-09-0035-00-0000-ofcom-consultation-digi tal-dividend-cognitive-access, IEEE-Sa Mentor, Piscataway, NJ USA, vol. 802.18, Mar. 10, 2009 (Mar. 10, 2009), pp. 1-63, XP017662485.

Extended European Search Report dated Feb. 7, 2022, in corresponding European Patent Application No. 21200902.1.

International Search Report dated Mar. 1, 2016 in PCT/CN2015/095761 filed Nov. 27, 2015.

Chinese Office Action dated Jun. 3, 2020 in Chinese Application No. 201410709083.1.

Juncheng Jia, et al., "In-band Bootstrapping in Database-driven Multi-hop Cognitive Radio Networks", The 11th Annual IEEE CCNC—Wireless Communications Track, 2014, pp. 611-616.

* cited by examiner

CONTROL APPARATUS AND METHOD FOR WIRELESS COMMUNICATION SYSTEM SUPPORTING COGNITIVE RADIO

CROSS-REFERENCE TO RELATED APPLICATIONS

This application is a divisional of U.S. application Ser. No. 15/510,752, filed Mar. 13, 2017, which is based on PCT filing PCT/CN2015/095761, filed Nov. 27, 2015, which claims priority to CN 201410709083.1, filed Nov. 28, 2014, the entire contents of each are incorporated herein by its reference.

FIELD

The present disclosure generally relates to the field of wireless communication, and particularly to a control apparatus and a control method for a wireless communication system supporting cognitive radio.

BACKGROUND

At present, countries have begun to develop specifications for sharing spectrums granted to specific systems. These spectrums which can be shared by other systems may include, for example, television frequency band, 3.5 GHz frequency band, 5 GHz frequency band and the like. These specifications require a communication system, when functioning as a secondary system to use a frequency band granted to another system, to firstly provide, for example, geographic location information of the secondary system to a device for controlling spectrum allocation, such as a Geographic Location Data Base (GLDB), thereby acquiring an available spectrum resource determined by the GLDB according to the geographic location information. For example, when the geographic location or a system parameter of the secondary system is changed, the secondary system needs to re-access the GLDB. Further, the secondary system may be configured to access the GLDB periodically in order to ensure that the spectrum resource is constantly effective.

SUMMARY

A brief summary of the embodiments of the present disclosure are provided below to provide some basic understanding to some aspects of the present disclosure. It should be understood that the summary is not exhaustive, and is not intended to identify a crucial or important part of the present disclosure or limit the scope of the present disclosure. The only purpose is to give some conception in a simplified manner as a prelude to the detailed description provided later.

According to an embodiment of the present disclosure, there is provided a control apparatus for a wireless communication system supporting cognitive radio, which includes an acquisition unit and a management unit. The acquisition unit is configured to acquire information on at least one factor which can influence transmission performance of an access request for a spectrum resource from a communication apparatus, the access request being lit used for requesting a device for controlling spectrum allocation to allocate a spectrum to the communication apparatus. The management unit is configured to receive the access request transmitted by the communication apparatus, and perform optimization on a routing of the access request from the communication apparatus according to the acquired factor in a case that the access request contains information indicating that the communication apparatus is a slave apparatus for another communication apparatus.

According to another embodiment of the present disclosure, there is provided a control method fir a wireless communication system supporting cognitive radio. The method includes acquiring information on at least one factor which can influence transmission performance of an access request for a spectrum resource from a communication apparatus, the access request being used for requesting a device for controlling spectrum allocation to allocate a spectrum to the communication apparatus. The method further includes receiving the access request transmitted by the communication apparatus, and performing optimization on a routing of the access request from the communication apparatus according to the acquired factor in a case that the access request contains information indicating that the communication apparatus is a slave apparatus for another communication apparatus.

According to another embodiment of the present disclosure, there is provided a control apparatus for a wireless communication system supporting cognitive radio, which includes a communication unit and a control unit. The communication unit is configured to receive an access request for a spectrum resource from a first cognitive radio apparatus managed by the control apparatus. The control unit is configured to parse an apparatus parameter of the first cognitive radio apparatus to determine routing information of the access request from the first cognitive radio apparatus, and to provide available spectrum resource information for the first cognitive radio apparatus in response to the access request and on the basis of the routing information. The routing information corresponds to a second cognitive radio apparatus, and the first cognitive radio apparatus is capable of communicating with the second cognitive radio apparatus using a spectrum resource available to the second cognitive radio apparatus.

According to another embodiment of the present disclosure, there is provided a control method for a wireless communication system supporting cognitive radio. The method includes receiving an access request for a spectrum resource from a first cognitive radio apparatus. The method further includes parsing an apparatus parameter of the first cognitive radio apparatus to determine routing information of the access request from the first cognitive radio apparatus, and providing available spectrum resource information for the first cognitive radio apparatus in response to the access request and on the basis of the routing information. The routing information corresponds to a second cognitive radio apparatus, and the first cognitive radio apparatus is capable of communicating with the second cognitive radio apparatus using a spectrum resource available to the second cognitive radio apparatus.

According to another embodiment of the present disclosure, there is provided a control apparatus for a wireless communication system supporting cognitive radio, which includes a communication unit and a control unit. The communication unit is configured to receive access requests for spectrum resources from multiple cognitive radio apparatuses. The control unit is configured to merge, based on time characteristics of the access requests for spectrum resources of multiple cognitive radio apparatuses, the access requests for spectrum resources from corresponding multiple cognitive radio apparatuses into a single access request, and to control the communication unit to transmit the single access request to a device for controlling spectrum allocation, so as to allocate spectrum resources to the multiple radio apparatuses.

According to another embodiment of the present disclosure, there is provided a control method for a wireless communication system supporting cognitive radio. The method includes receiving access requests for spectrum resources from multiple cognitive radio apparatuses. The method further includes merging, based on time characteristics of the access requests for spectrum resources of multiple cognitive radio apparatuses, the access requests for spectrum resources from corresponding multiple cognitive radio apparatuses into a single access request, and controlling a communication unit to transmit the single access request to a device for controlling spectrum allocation, so as to allocate spectrum resources to the multiple cognitive radio apparatuses.

According to another embodiment of the present disclosure, there is provided a cognitive radio apparatus, which includes a control unit and a communication unit. The control unit is configured to generate an apparatus parameter of the cognitive radio apparatus based on a second cognitive radio apparatus to which the cognitive radio apparatus currently accesses, where the apparatus parameter includes routing information corresponding to the second cognitive radio apparatus. The communication unit is configured to transmit the apparatus parameter to a control apparatus for the cognitive radio apparatus to obtain available spectrum resource information provided by the control apparatus.

The apparatus and the method according to the embodiments of the present disclosure are advantageous for at least one of the following aspects: reducing the overall communication overhead when the cognitive radio apparatus accesses the device for controlling spectrum allocation in order to obtain a authorization for the spectrum resource; and reducing the possibility of the information interaction between the cognitive radio apparatus and the device for controlling spectrum allocation such as the GLIB being interrupted.

BRIEF DESCRIPTION OF THE DRAWINGS

The present disclosure can be better understood by referring to the following description taken in conjunction with the accompanying drawings. Same or similar reference characters indicate same or similar parts throughout the accompanying drawings. The accompanying drawings are included in the description together with the following specifications as a part of the description for further illustrating preferred embodiments with examples and explaining the principle and advantages of the present disclosure. In the accompanying drawings.

DETAILED DESCRIPTION OF THE EMBODIMENTS

Figure 1:
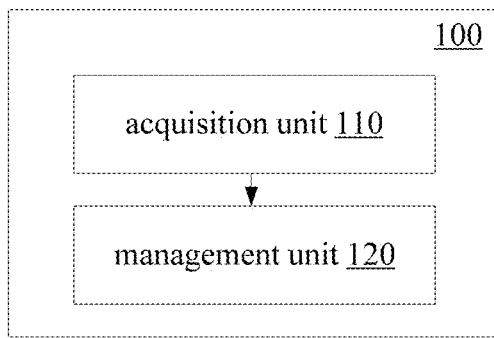
FIG. 1 is a block diagram illustrating a configuration example of a control apparatus for a wireless communication system supporting cognitive radio according to an embodiment of the present disclosure.

Embodiments of the present disclosure are described below with reference to the companying drawings. Elements and features described in a companying drawing or an embodiment may be combined with elements and features illustrated in one or more other companying drawings or embodiments in the present disclosure. It should be noted that presentation and explanation of irrelevant components and processes known by those skilled in the art are omitted in the companying drawings and the description for clarity, FIG. 1 illustrates a configuration example of a control apparatus 100 for a wireless communication system supporting cognitive radio according to an embodiment of the present disclosure.

The control apparatus 100 includes an acquisition unit 110 and a management unit 120.

The acquisition unit 110 is configured to acquire information on at least one factor which can influence transmission performance of an access request for a spectrum resource from a communication apparatus.

The communication apparatus may include a cognitive radio apparatus which can use a frequency band granted to another system (for example, television frequency band, 3.5 GHz, frequency band, 5 GHz, frequency band and the like) for communication. In some examples, such a communication apparatus is also referred to as a secondary system or a secondary user. Correspondingly, a communication system which is authorized to use the frequency band is referred to as a primary system or a primary user. For example, the primary system may be a broadcast television system or a radar system, while the secondary system is a WiFi communication system which opportunistically uses a broadcast television frequency band or a radar operation frequency band. As another example, the primary system may be a WiFi communication system, while the secondary system is a cellular communication apparatus which opportunistically uses a WiFi frequency band. In order to use these frequency bands, in a mainstream cognitive radio technology, the communication apparatus needs to transmit an access request for a spectrum resource to a device for controlling spectrum allocation, to request the device for controlling spectrum allocation (which is also referred to as spectrum allocation device in the following) to allocate a spectrum to the communication apparatus, thereby ensuring that no harmful interference will be caused to normal operation of the primary system. The spectrum allocation device may include, for example, a GeoLocation Data Base (GLDB) defined ETSI RRS standard series or an Advanced Geolocation Engine (AGE). Correspondingly, the access request for the spectrum resource may include geographic location information of the communication apparatus. The GLDB may determine a spectrum resource available to the communication apparatus based on the geographic location information and an interference suppression requirement of the primary system, and inform the communication apparatus of the spectrum resource information. It is to be noted that, the primary system as mentioned herein is not necessarily a communication system that has absolute authorized access to the spectrum. In some examples, secondary systems may be assigned to different priorities, and a resource is allocated to a secondary system with a lower priority in a case that resource requirements of secondary systems with higher priorities have been preferably met. In such examples, the secondary system with a higher priority also opportunistically uses the resource of the primary system, but it becomes a protected subject to a certain extent, and thus may be considered as a primary system in relation to a secondary system with a lower priority.

The factor which can influence transmission performance of the access request for the spectrum resource from the communication apparatus may include but not limited to a frequency of the access request, a location of the communication apparatus which transmits the access request, and a mobility of the communication apparatus which transmits the access request.

Based on different spectrum sharing specifications, the access request for the spectrum resource transmitted by the communication apparatus to the spectrum allocation device may have different time configurations. For example, a spectrum sharing specification may prescribe that a specific communication apparatus accesses the GLDB with a predetermined period to acquire an available spectrum resource. More particularly, for example, it may be prescribed that a specific type of communication apparatus or a communication apparatus located in a specific location area is required to transmit the access request with a specific period. In this case, different types of communication apparatuses or communication apparatuses located in different location areas may have different access request frequencies, thus the type or the location of the communication apparatus may be a factor that influences the transmission performance of the access request. Specifically, types of communication apparatuses may be divided, for example, based on different levels of maximum output powers of respective communication apparatuses, based on different levels of out-of-band spurious suppression capabilities of respective communication apparatuses, or based on interferences of respective communication apparatuses on other communication systems such as the primary system. Further, types of communication apparatus may also be divided based on priorities of the communication apparatuses on using the spectrum resource, for example, an access period of a type of communication system with a lower priority may be shorter than that of a type of communication system with a higher priority. All the possible cases are not exemplified one by one in the present disclosure. In addition, the above different location areas may be determined based on, for example, distances from the primary system. In another example, it may be prescribed that the communication apparatus is to re-access the GLDB when a location variation of the communication apparatus exceeds a predetermined level. In this case, communication apparatus with different movement characteristics access the GLDB at different frequencies. The mobility of the communication apparatus becomes a factor that influences the transmission performance of the access request. As another example, small cell base stations in a wireless communication system based on Long Term Evolution (LTE), when serving as communication apparatuses, may adopt different switch intermittence in order to save energy or to reduce interferences. Each time when a small cell base station is turned on, the small cell base station may need to re-access the GLDB to acquire an available spectrum resource. In this case, the switch time configuration of the communication apparatus such as the small cell base station becomes a factor that influences the transmission performance of the access request (such as an access period/access frequency). In summary, based on different spectrum sharing specifications, there may be multiple factors that influence the transmission performance of the access request, which is not limited to the specific examples in the present disclosure.

The acquisition unit 110 may acquire information on the above factors in various manners. For example, according to a specific spectrum sharing specification, the acquisition unit 110 may derive a predetermined period of an access request from a communication apparatus according to the type or location of the communication apparatus (for example, reported by the communication apparatus). Alternatively, the acquisition unit 110 may estimate the frequency of the access request from the communication apparatus based on information such as the mobility of the communication apparatus (for example, reported by the communication apparatus or derived according to history location information of the communication apparatus). Alternatively, the acquisition unit 110 may obtain the frequency of the access request from the communication apparatus based on history information of the access request transmitted by the communication apparatus.

In a case that the above factors need to be acquired based on history information, according to an embodiment, the control apparatus may include a storage unit (not shown in the drawings), which is configured to store history information on the access request for the spectrum resource from the communication apparatus and/or history information on the location or movement of the communication apparatus, thereby the acquisition unit 110 can acquire information on the above factors based on the history information stored in the storage unit.

The management unit 120 is configured to receive the access request transmitted by the communication apparatus, and perform optimization on a routing of the access request from the communication apparatus according to the acquired factor in a case that the access request contains information indicating that the communication apparatus is a slave apparatus for another communication apparatus.

During the communication between the communication apparatus and the spectrum allocation device, the communication apparatus which requests the spectrum resource may communicate with the spectrum allocation device via another apparatus which can connect to the spectrum allocation device. Specifically, the communication apparatus may transmit the access request for the spectrum resource to the other apparatus, which forwards the access request to the spectrum allocation device. In this case, the communication apparatus is a slave apparatus for the other apparatus. In other words, the other apparatus is a master apparatus for the communication apparatus. In an example of the present disclosure, the master apparatus also operates as the cognitive radio apparatus which firstly acquire an available spectrum resource from the spectrum allocation device and then communicates with the slave apparatus using the available spectrum resource.

As will be described in more detail later, the wireless communication system supporting cognitive radio to which the embodiments of the present disclosure may be applied may include a wireless communication system based on Long Term Evolution (LTE) or a wireless communication system based on Wireless Fidelity (WiFi) (for example, based on IEEE 802.11af).

For the wireless communication system based on LTE, the control apparatus according to the embodiments of the present disclosure may be located on a base station (for example, a macro base station or a small cell base station) side. The communication apparatus may communicate with the spectrum allocation device via one of base stations in the system. In this case, the communication apparatus is the slave apparatus for the base station, and the communication apparatus may include, in the access request, information indicating that the communication apparatus is the slave apparatus for the base station, such as routing information.

For the wireless communication system based on WiFi, the control apparatus according to the embodiments of the present disclosure may be located on a server (for example, a Registered Location Security Server (RLSS)) side. The communication apparatus may be connected to the server via one of WiFi access points in the system, and access the spectrum allocation device via the server. In this case, the communication apparatus is the slave apparatus for the access point, and the communication apparatus may include, in the access request, information indicating that the communication apparatus is the slave apparatus for the access point, such as routing information.

For one communication apparatus, there may be multiple candidate master apparatuses. In other words, the communication apparatus may access the spectrum allocation device via different base stations or access points. The management unit 120 performs optimization on a routing of the access request from the communication apparatus according to the acquired factor which can influence transmission performance of the access request for the spectrum resource from the communication apparatus. The optimization on the routing indicates changing a relay node for the access request thereby improving transmission performance of the access request. As will be described in more detail later in conjunction with specific embodiments, this optimization may include reducing the difference between the frequency of the access request for the spectrum resource from the communication apparatus and the frequency of the access request for the spectrum resource from the master apparatus for the communication apparatus, or increasing the stability of a link between the communication apparatus and the master apparatus for the communication apparatus, or the like.

In the communication system supporting cognitive radio to which the embodiments of the present disclosure may be applied the master apparatus for the communication apparatus (the communication apparatus accesses the spectrum allocation device via the master apparatus) may also use a spectrum resource including a frequency band granted to another system by transmitting an access request for the spectrum resource. Correspondingly, the master apparatus also needs to transmit the access request based on a predetermined spectrum sharing specification, for example, with a predetermined period or according to other time configurations.

According to a specific embodiment, the management unit of the control device may be configured to re-determine a master apparatus for the communication apparatus (the communication apparatus accesses the spectrum allocation device via the master apparatus), such that the difference between the frequency of the access request for the spectrum resource from the communication apparatus and the frequency of the access request for the spectrum resource from the master apparatus for the communication apparatus is reduced. For example, in a case that the communication apparatus and the master apparatus for the communication apparatus needs to transmit the access request with a specified period, the acquisition unit may acquire periods of access requests from the communication apparatus, the master apparatus for the communication apparatus and other candidate master apparatuses (for example, other base stations or access points that can serve as relay nodes for the communication apparatus). In a case that the period of the access request from a certain candidate master apparatus is closer to the period of the access request from the communication apparatus as compared with the current master apparatus, the communication apparatus may be informed to take the candidate master apparatus as the master apparatus. In some examples of the present disclosure, the control apparatus for the communication apparatus may also communicate with a neighboring control apparatus which manages, for example, a neighboring geographic location area, thereby acquiring GLDB access periods, and/or information such as switch configurations, geographic locations, transmission powers, movement characteristics of all (or only some) of the communication apparatuses managed by the neighboring control apparatus. In such an example, the control apparatus selects the above candidate master apparatus from the communication apparatuses managed by itself and communication apparatuses managed by the neighboring control apparatus, thereby determining the master apparatus, for example, of which the access period is closest to the access period of communication apparatus.

Further, the management unit may also be configured to transmit the access requests from the communication apparatus and the master apparatus for the communication apparatus to the spectrum allocation device as a single access request. For example, in a case that a time difference between the access request from the communication apparatus and the access request from the master apparatus for the communication apparatus is less than a predetermined threshold, these access requests may be transmitted as a single access request, thereby reducing an overall communication overhead due to access the spectrum allocation device and the load on the spectrum allocation device for separately responding to each access request. In a case of performing the above optimization on the routing such that the difference between the frequency of the access request for the spectrum resource from the communication apparatus and the frequency of the access request for the spectrum resource from the master apparatus for the communication apparatus is reduced, more access requests can be merged and transmitted.

In addition, in a case of performing the above optimization on the routing such that the difference between the frequency of the access request for the spectrum resource from the communication apparatus and the frequency of the access request for the spectrum resource from the master apparatus of the communication apparatus is reduced, the management unit may also be configured to inform the communication apparatus to synchronize a timing of the access request therefrom with a timing of the access request from the master apparatus for the communication apparatus. In a case that the timing of the access request from the communication apparatus is synchronized with the timing of the access request from the master apparatus for the communication apparatus, these synchronized access requests can be transmitted to the spectrum allocation device as a single access request, thereby further reducing the overall communication overhead due to access to the spectrum allocation device.

In another aspect, the objects of the optimization on the routing of the access request from the communication apparatus may include improving the stability of the link between the communication apparatus and the master apparatus for the communication apparatus. Correspondingly, according to a specific embodiment, the management unit is configured to re-determine a master apparatus for the communication apparatus, such that the stability of the link between the communication apparatus and the master apparatus for the communication apparatus is improved.

It is to be noted that, the stability of the link may depend not only on a factor of signal strength between the communication apparatus and the master apparatus, but also on the mobility of the communication apparatus and/or the master apparatus for the communication apparatus, and the like. For example, the communication apparatus may select the master apparatus for the communication apparatus according to the signal strength. However, if the location of the master apparatus is frequently changed, it is possible that the master apparatus needs to frequently access the spectrum allocation device, and may not be able to continue to use a certain spectrum resource due to a failure in a corresponding connection, which may cause the communication apparatus to be unable to access the spectrum allocation device via the master apparatus, thereby reducing the stability of the link. In addition, in a case that the communication apparatus has a high mobility, it is desirable that the master apparatus has a signal coverage that can ensure a stable network connection during movement of the communication apparatus.

Therefore, the management unit is configured to consider, when performing optimization on the routing of the access request from the communication apparatus, factors including but not limited to a distance between the master apparatus and the communication apparatus, the movement of the master apparatus, and the signal coverage of the master apparatus. In some examples of the present disclosure, the control apparatus for the communication apparatus may also communicate with a neighboring control apparatus which manages, for example, a neighboring geographic location area thereby acquiring information such as transmission powers, geographic locations, movement characteristics, and switch configurations of all (or only some) of the communication apparatuses managed by the neighboring control apparatus. In such an example, the control apparatus selects the master apparatus from the communication apparatuses managed by itself and communication apparatuses managed by the neighboring control apparatus, thereby determining the master apparatus of which, for example, the signal coverage, the signal strength and the timing all meet the communication requirements of the communication apparatus.

In the following, an overview of a method according to an embodiment of the present disclosure is provided without repeatedly describing certain details which are discussed in the above.

The method according to the embodiment may be applied to a wireless communication system supporting cognitive radio. The method, for example, may be executed by a base station or a server, or may be executed by a control apparatus communicatively connectable to a communication apparatus in the communication system.

Figure 2:
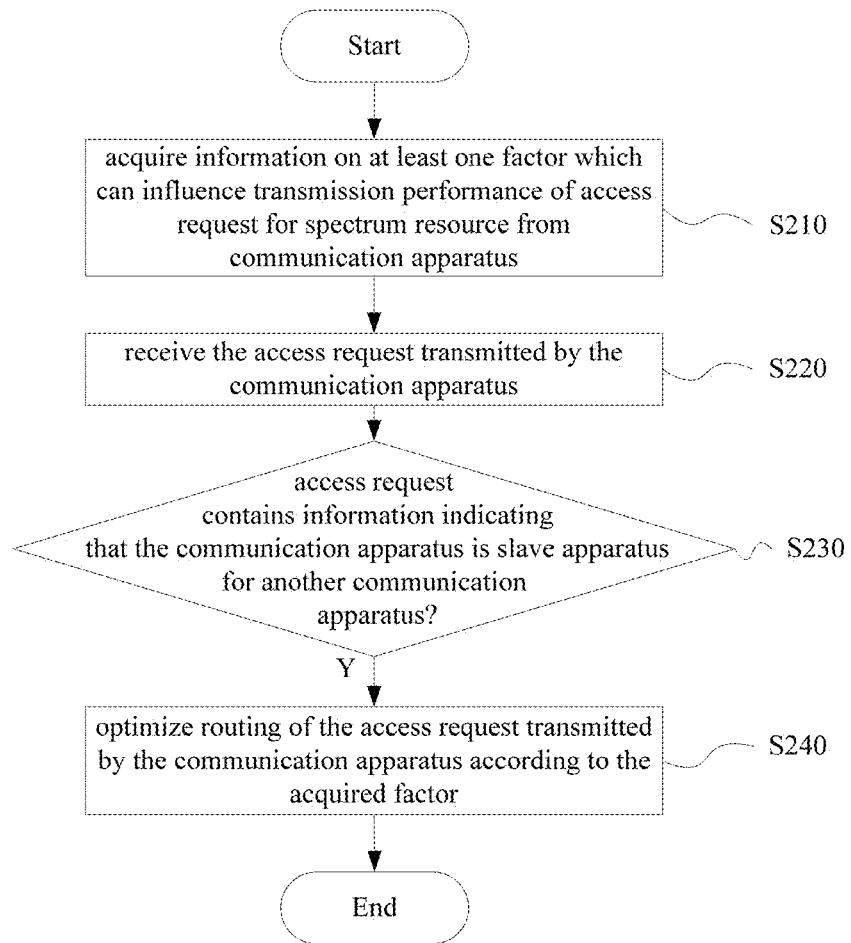
FIG. 2 is flow chart illustrating a process example of a control method for a wireless communication system supporting cognitive radio according to another embodiment of the present disclosure.

As shown in FIG. 2, in step S210, information on at least one factor which can influence a transmission performance of an access request for a spectrum resource from a communication apparatus is acquired. The access request being used for requesting a device for controlling spectrum allocation to allocate a spectrum to the communication apparatus. The factor which can influence transmission performance of the access request for the spectrum resource from the communication apparatus may include, for example, a frequency of the access request, a location of the communication apparatus, and a movement of the communication apparatus.

Next, in step S220, the access request transmitted by the communication apparatus is received.

In a case that the access request contains information indicating that the communication apparatus is a slave apparatus for another communication apparatus (Y in step S230), in step S240, optimization is performed on a routing of the access request from the communication apparatus according to the acquired factor.

The optimization may include re-determining the master apparatus for the communication apparatus, such that the difference between the frequency of the access request from the communication apparatus and that of its master apparatus is reduced.

The frequency of the access request may be determined according to a specific spectrum sharing specification. Further, the frequency of the access request may be determined based on history information on the access request from the communication apparatus.

For example, in a case that a time difference between the access request from the communication apparatus and the access request from the master apparatus for the communication apparatus is less than a predetermined threshold, these access requests may be transmitted as a single access request. In addition, a timing of the access request from the communication apparatus may be synchronized with a timing of the access request from the master apparatus, thus the synchronized access requests can be transmitted to the spectrum allocation device as a single access request.

In another aspect, optimization of the routing of the access request may include re-determining a master apparatus for the communication apparatus, such that the stability of a link between the communication apparatus and the master apparatus for the communication apparatus is improved. For example, the above optimization may be performed according to one or more of the following factors: a distance between the master apparatus and the communication apparatus, a movement of the master device and a signal coverage of the master apparatus.

Figure 3:
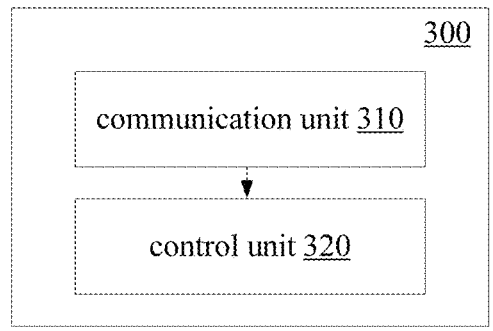
FIG. 3 is a block diagram illustrating a configuration example of a control apparatus according to another embodiment of the present disclosure.

FIG. 3 illustrates a configuration example of a control apparatus 300 for a wireless communication system supporting cognitive radio according to another embodiment of the present disclosure.

The management object of the control apparatus 300 includes a cognitive radio apparatus which can communicate using a frequency band granted to another system (for example, television frequency band, 3.5 GHz frequency band, 5 GHz frequency band and the like). In order to use these frequency bands, the cognitive radio apparatus needs to transmit an access request for a spectrum resource to a spectrum allocation device, to request the spectrum allocation device to allocate a spectrum to the cognitive radio apparatus. The spectrum allocation device may include, for example, a GeoLocation Data Base (GLDB). Correspondingly, the access request for spectrum resource may include geographic location information of the cognitive radio apparatus, and the GLIB may determine a spectrum resource available to the cognitive radio apparatus based on the geographic location information, and inform the cognitive radio apparatus of the available spectrum resource information.

The control apparatus 300 includes a communication unit 310 and a control unit 320.

The communication unit 310 is configured to receive an access request for a spectrum resource from a first cognitive radio apparatus managed by the control apparatus 300. In addition, as will be described later, the communication unit 310 may also be configured to communicate with the cognitive radio apparatus, the spectrum allocation device or the like, in order to, for example, transmit the access request from the cognitive radio apparatus to the spectrum management device, provide the spectrum allocation information from the spectrum allocation device to the cognitive radio apparatus, and the like.

The control unit 320 is configured to parse an apparatus parameter of the first cognitive radio apparatus to determine routing information of the access request from the first cognitive radio apparatus, and to provide available spectrum resource information for the first cognitive radio apparatus in response to the access request and on the basis of the routing information, where the routing information may indicate a second cognitive radio apparatus, and the first cognitive radio apparatus is capable of communicating with the second cognitive radio apparatus using a spectrum resource available to the second cognitive radio apparatus.

The apparatus parameter may contain, for example, information indicating that the first cognitive radio apparatus is the slave apparatus for another apparatus (that is, the second cognitive radio apparatus).

For example, the apparatus parameter may contain, for example, information defined in the extended capabilities element described in section 8.4.2.24 of IEEE 802.11af.

In addition, it is to be noted that, the apparatus parameter may be transmitted together with the access request for the spectrum resource, or may be transmitted separately from the access request. For example, according to a specific spectrum sharing specification, the spectrum resource allocated by the spectrum allocation device has a specific valid period. For example, when the valid period of the spectrum resource is expired, the communication apparatus retransmits a current apparatus parameter together with an access request for a spectrum resource to the spectrum allocation device, such that the spectrum allocation device reallocates a spectrum resource. As another example, during the valid period of the allocated spectrum resource, the communication apparatus may transmit a spectrum request to the spectrum allocation device in order to confirm that the currently used spectrum may continue to be used, or available spectrum resources are not updated in the GLDB. However, the apparatus parameter is not necessarily transmitted together with the access request each time when the access request is transmitted. For example, the cognitive radio apparatus may transmit the apparatus parameter thereof when transmitting a communication initialization request. After that, the apparatus parameter is updated only in a case that the apparatus parameter is changed due to a variation in the location of the cognitive radio apparatus.

In this embodiment, even in a case that no available spectrum resource is allocated, the first cognitive radio apparatus can still communicate with the second cognitive radio apparatus, to which an available spectrum resource is allocated, using the spectrum resource of the second cognitive radio apparatus, thereby, for example, communicating with the spectrum allocation device via the second cognitive radio apparatus in order to obtain allocation of an available spectrum resource.

According to an embodiment, the control unit 320 may be configured to control the communication unit 310 to transmit a reconfiguration request to the first cognitive radio apparatus, where the reconfiguration request may include routing information specified by the control apparatus 300. That is, the control apparatus 300 may indicate, through the communication unit 310, the first cognitive radio apparatus to change its master apparatus.

Specifically, the control unit 310 may re-determine the master apparatus for the first cognitive radio apparatus based on a time characteristic of the access request for a spectrum resource from the first cognitive radio apparatus. For example, in a case that the first cognitive radio apparatus transmits the access request with a predetermined period, the control unit 310 may determine an apparatus having a period of access request closest to that of the first cognitive radio apparatus as the master apparatus for the first cognitive radio apparatus. In addition, the control unit 310 may re-determine the master apparatus for the first cognitive radio apparatus based on the mobility information of the first cognitive radio apparatus. For example, in a case that the first cognitive radio apparatus moves frequently, the master apparatus for the first cognitive radio apparatus may be determined based on signal coverage and the like, in order to, for example, ensure stability of the connection.

In addition, the reconfiguration request transmitted by the control unit 320 to the first cognitive radio apparatus may also include a time configuration of the access request specified by the control apparatus 300. That is, the control apparatus 300 may instruct, through the communication unit 310, the first cognitive radio apparatus to change the timing for initiating the access request.

Specifically, the control unit 320 may be configured to determine the time configuration of the access request specified for the first cognitive radio apparatus based on a time characteristic of the access request for the spectrum resource from the first cognitive radio apparatus corresponding to the routing information.

In a case that the timing of the access request from the first cognitive radio apparatus is synchronized with the timing of the access request from the master apparatus for the first cognitive radio apparatus, or the time difference between the access requests is less than a predetermined threshold, the control unit 320 is further configured to merge access requests for spectrum resources respectively from the first cognitive radio apparatus and the master apparatus for the first cognitive radio apparatus into a single access request and to control the communication unit 310 to transmit the single access request to the spectrum allocation device, so as to provide the available spectrum resource information for the first cognitive radio apparatus and the master apparatus for the first cognitive radio apparatus.

Correspondingly, in a case that the available spectrum resource information is provided by the spectrum allocation device in response to the access request, the control unit 320 may be configured to include the available spectrum resource information for the first cognitive radio apparatus in an available spectrum resource indication message for the master apparatus for the first cognitive radio apparatus, thereby providing the available spectrum resource information to the first cognitive radio apparatus via the master apparatus for the first cognitive radio apparatus.

With the above configuration, the overall communication overhead associated with spectrum allocation can be effectively reduced.

In the following, an overview of a method corresponding to the above embodiment is provided without repeatedly describing certain details which are discussed in the above.

The method according to this embodiment may be applied to a wireless communication system supporting cognitive radio. For example, the method may be executed by a base station or a server, or may be executed by a control apparatus communicatively connectable to a cognitive radio apparatus in the communication system.

Figure 4:
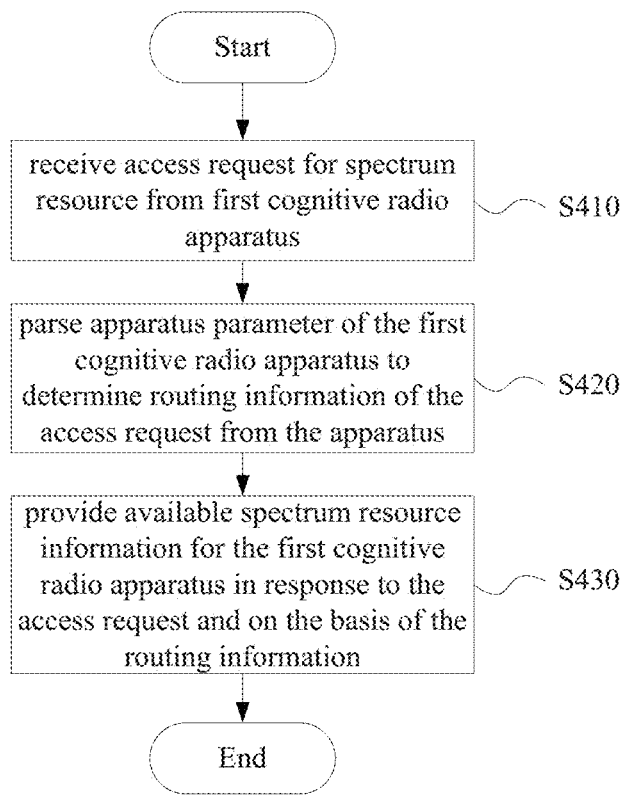
FIG. 4 is a flow chart illustrating a process example of a control method according to another embodiment of the present disclosure.

As shown in FIG. 4, the control method for the wireless communication system supporting cognitive radio according to this embodiment includes step S410, in which an access request for spectrum resource from a first cognitive radio apparatus is received.

In step S420, an apparatus parameter of the first cognitive radio apparatus is parsed to determine routing information of the access request from the first cognitive radio apparatus, where the routing information corresponds to a second cognitive radio apparatus, and the first cognitive radio apparatus is capable of communicating with the second cognitive radio apparatus using a spectrum resource available to the second cognitive radio apparatus.

In step S430, available spectrum resource information is provided for the first cognitive radio apparatus in response to the access request and on the basis of the routing information.

Figure 5:
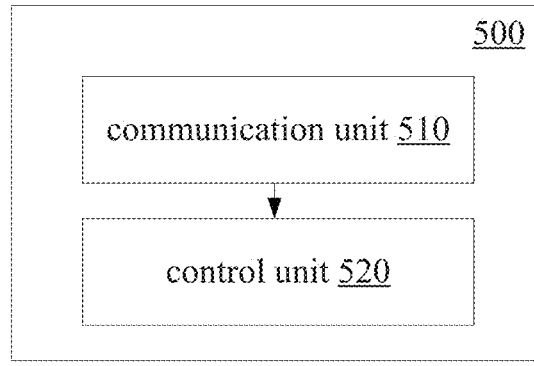
FIG. 5 is a block diagram illustrating a configuration example of a control apparatus according to another embodiment of the present disclosure.

FIG. 5 illustrates a configuration example of a control apparatus 500 for a wireless communication system supporting cognitive radio according to another embodiment of the present disclosure.

The control apparatus 500 includes a communication unit 510 and a control unit 520. The control apparatus 500 according to this embodiment is capable of controlling access requests for spectrum resources from two or more cognitive radio apparatuses.

The communication unit 510 is configured to receive access requests for spectrum resources from multiple cognitive radio apparatuses.

The control unit 520 is configured to merge, based on time characteristics of the access requests for spectrum resources from multiple cognitive radio apparatuses, corresponding multiple access requests into a single access request, and to control the communication unit 510 to transmit the single access request to a device for controlling spectrum allocation, so as to allocate spectrum resources to the multiple radio apparatuses.

The access requests merged into a single access request may be access requests from some of the cognitive radio apparatus managed by the control apparatus 500. For example, in a case that access requests from the managed cognitive radio apparatuses have different periods, access requests from cognitive radio apparatus having the same or similar periods may be merged into a single access request.

Further, the control unit 520 may also control the communication unit 510 to instruct a controlled cognitive radio apparatus to change the time configuration of the access request from the cognitive radio apparatus, such that timings of access requests from at least some of the cognitive radio apparatus are synchronized, thus the control unit 520 can merge the synchronized access requests from these cognitive radio apparatus into a single access request.

With the above configuration, the overall communication overhead due to access to the spectrum allocation device can be effectively reduced.

Correspondingly, embodiments of the disclosure further include a control method for a wireless communication system supporting cognitive radio.

Figure 6:
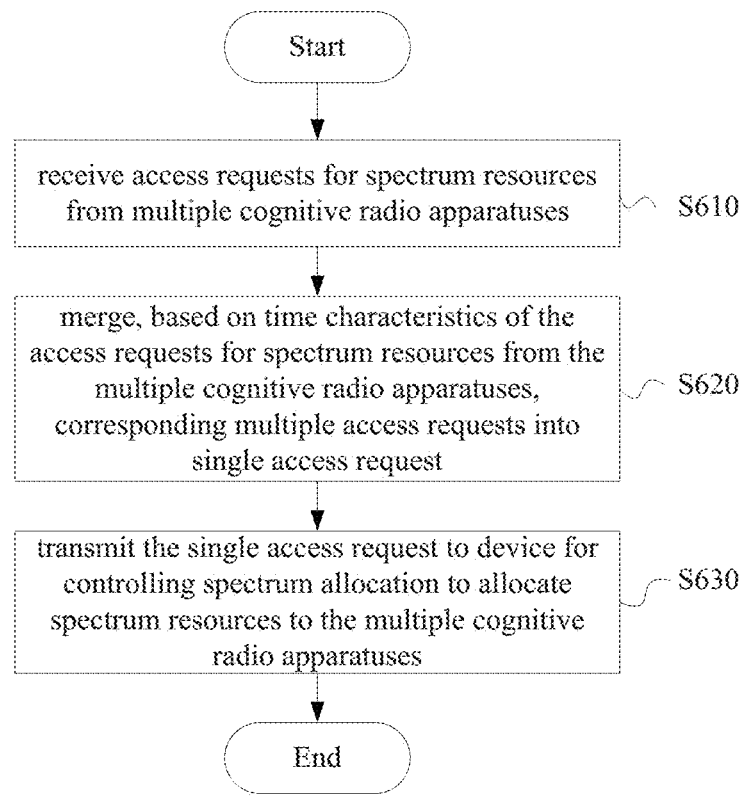
FIG. 6 is a flow chart illustrating a process example of a control method according to another embodiment of the present disclosure.

As shown in FIG. 6, in step S610, access requests for spectrum resources from multiple cognitive radio apparatuses are received.

Next, in step S620, based on time characteristics of access requests for spectrum resources from multiple cognitive radio apparatuses, corresponding multiple access requests are merged into a single access request. Here, the corresponding multiple access requests may include access requests from some of the managed cognitive radio apparatuses.

Then, in step S630, the single access request is transmitted to a device for controlling spectrum allocation, so as to allocate spectrum resources to the multiple cognitive radio apparatuses.

Figure 7:
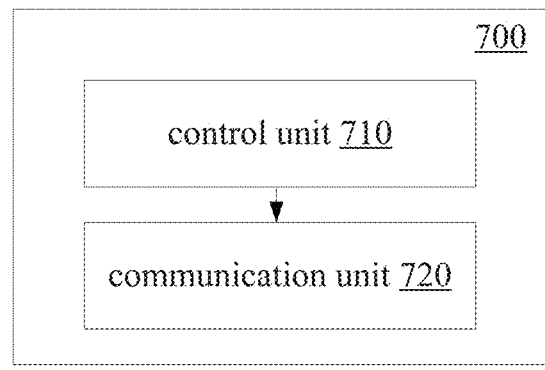
FIG. 7 is a block diagram illustrating a configuration example of a cognitive radio apparatus according to another embodiment of the present disclosure.

A cognitive radio apparatus is further provided according to an embodiment of the present disclosure. As shown in FIG. 7, the cognitive radio apparatus 700 according to the embodiment of the present disclosure includes a control unit 710 and a communication unit 720.

The control unit 710 is configured to generate an apparatus parameter of the cognitive radio apparatus based on a second cognitive radio apparatus to which the cognitive radio apparatus currently accesses, where the apparatus parameter includes routing information corresponding to the second cognitive radio apparatus. That is, the control unit 710 may generate information indicating that the cognitive radio apparatus 700 is to serve as a slave apparatus for another cognitive radio apparatus.

As described above, the apparatus parameter may be transmitted together with the access request for the spectrum resource, or may be transmitted separately from the access request.

The communication unit is configured to transmit the apparatus parameter to a control apparatus for the cognitive radio apparatus 700 to obtain available resource information provided by the control apparatus. The control apparatus may include control apparatuses according to the embodiments of the present disclosure described above with reference to FIG. 1, 3 or 5.

According to this embodiment, even in a case that no available spectrum resource is allocated, the cognitive radio apparatus can still communicate with the spectrum allocation device via the second cognitive radio apparatus to which an available spectrum resource is allocated, such as the control apparatus, in order to obtain allocation of an available spectrum resource.

According to a specific embodiment, the communication unit 720 is further configured to receive a reconfiguration request from the control apparatus, where the reconfiguration request may include routing information specified by the control apparatus. In other words, the cognitive radio apparatus 700 can change its master apparatus according to an instruction from the control apparatus.

Specifically, the reconfiguration request may include a time configuration of an access request for an available spectrum resource from the cognitive radio apparatus specified by the control apparatus. For example, the cognitive radio apparatus 700 may change a period, a specific timing and the like of the access request thereof according to an indication from the control apparatus. Thus, the control apparatus can merge the access request from the cognitive radio apparatus 700 and an access request from the master apparatus for the cognitive radio apparatus 700 and transmit the merged access request to the spectrum allocation device, thereby reducing the communication overhead for access to the spectrum allocation device.

In addition, the control unit 710 may be configured to access, based on the reconfiguration request from the control apparatus, a third cognitive radio apparatus corresponding to the routing information specified by the control apparatus, to transmit the access request for the available spectrum resource via the third cognitive radio apparatus. In other words, the cognitive radio apparatus 700 can transmit the access request via a new master apparatus according to an instruction from the control apparatus, where the new master apparatus is, for example, an apparatus having a time configuration of the access request closer to that of the cognitive radio apparatus 700, or which can provide a more stable connection.

Further, a wireless communication system supporting cognitive radio is further provided according to an embodiment of the present disclosure, the system includes the control apparatus 100, 300 or 500 according to the above embodiments.

The wireless communication system according to the embodiment of the present disclosure may include a wireless communication system based on Long Term Evolution (LTE) or a wireless communication system based on Wireless Fidelity (WiFi). In the following, an exemplary wireless communication system is described in conjunction with schematic diagrams shown in FIGS. 8 and 9.

Figure 8:
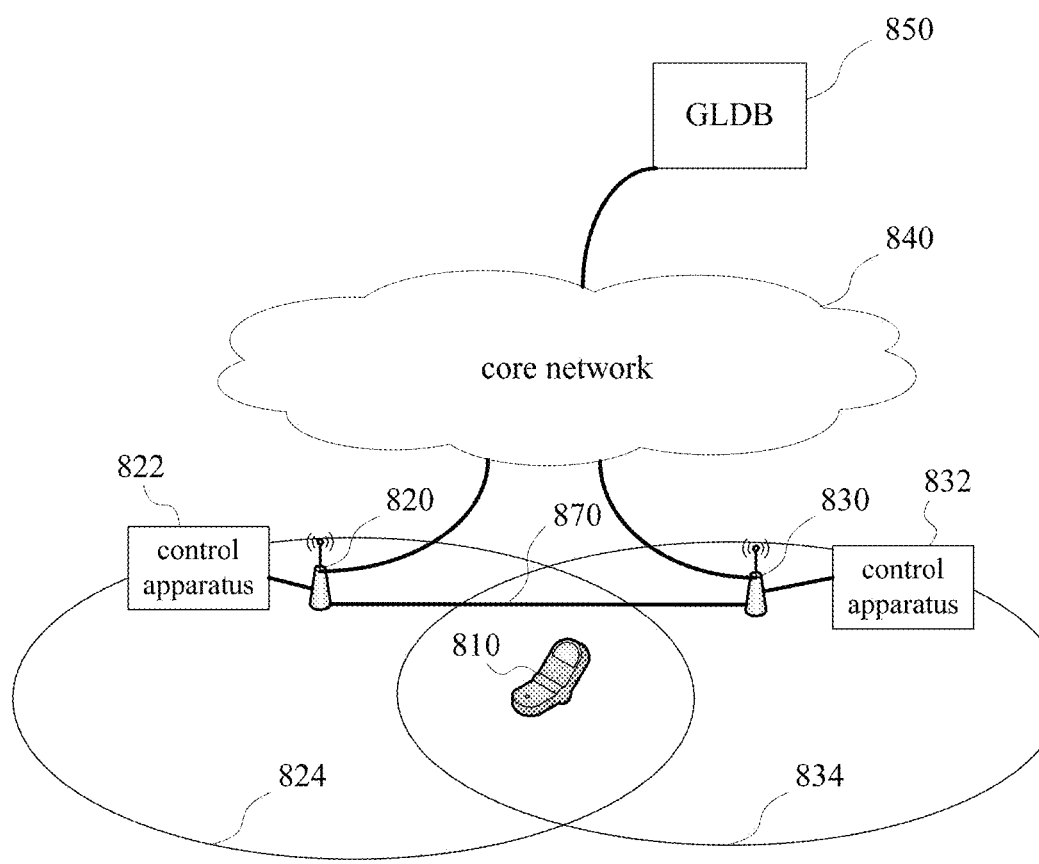
FIG. 8 is a schematic diagram illustrating a wireless communication system supporting cognitive radio according to another embodiment of the present disclosure.

As shown in FIG. 8, in a wireless communication system based on LTE, a cognitive radio apparatus 810 is within the cover ranges (which are respectively indicated by 824 and 834) of base station 820 and base station 830, where the base station 820 and the base station 830 may include macro base stations or small cell base stations. In the shown example, the cognitive radio apparatus 810 is a mobile phone. However, the cognitive radio apparatus 810 may include other types of cognitive radio apparatuses.

The base station 820 and the base station 830 are respectively provided with a control apparatus 822 and a control apparatus 830, which may have the configuration described above in conjunction with specific embodiments.

The base station 820 and the base station 830 may be connected to a spectrum allocation device such as a GLDB 850 via a core network 840, and acquire available spectrum resources by transmitting access requests for spectrum resources to the GLDB 850.

The cognitive radio apparatus 810 may take one of the base station 820 and the base station 830 as the master apparatus for transmitting the access request for the spectrum resource to the GLDB 850.

Further, a communication link 870 such as an X2 interface may be provided between the base station 820 and the base station 830, for communication between the base station 820 and the base station 830. With the communication link 870, the base station 820 and the base station 830 may exchange, for example, information such as GLDB access periods, and/or switch configurations, geographic locations, transmission powers, movement characteristics and the like of all (or only some) of communication apparatuses respectively managed by the base station 820 and the base station 830, in order to check whether a communication apparatus managed by one of the base station 820 and the base station 830 is more suitable to be served by the other. For example, in a case of the base station 820 determining in the manner described in the above embodiments that the cognitive radio apparatus 810 is more suitable to be served by the base station 830, a handover request associated with the cognitive radio apparatus 810 is transmitted to the base station 830 via the communication link 870, and base station configuration information transmitted by the base station 830 is acquired, in order to perform a handover configuration, including modification of a database access manner, on the cognitive radio apparatus 810.

The control apparatus 822 or 832 may instruct the cognitive radio apparatus 810 to change the master apparatus for the cognitive radio apparatus 810 in the manner described above, for example, according to the time configuration of the access request, such that, for example, the time configuration of the access request from the cognitive radio apparatus 810 is closer to the time configuration of the access request from the master apparatus for the cognitive radio apparatus 810, thus the access request from the cognitive radio apparatus 810 and the access request from the master apparatus for the cognitive radio apparatus 810 can be transmitted to the GLDB 850 as a single access request.

Figure 9:
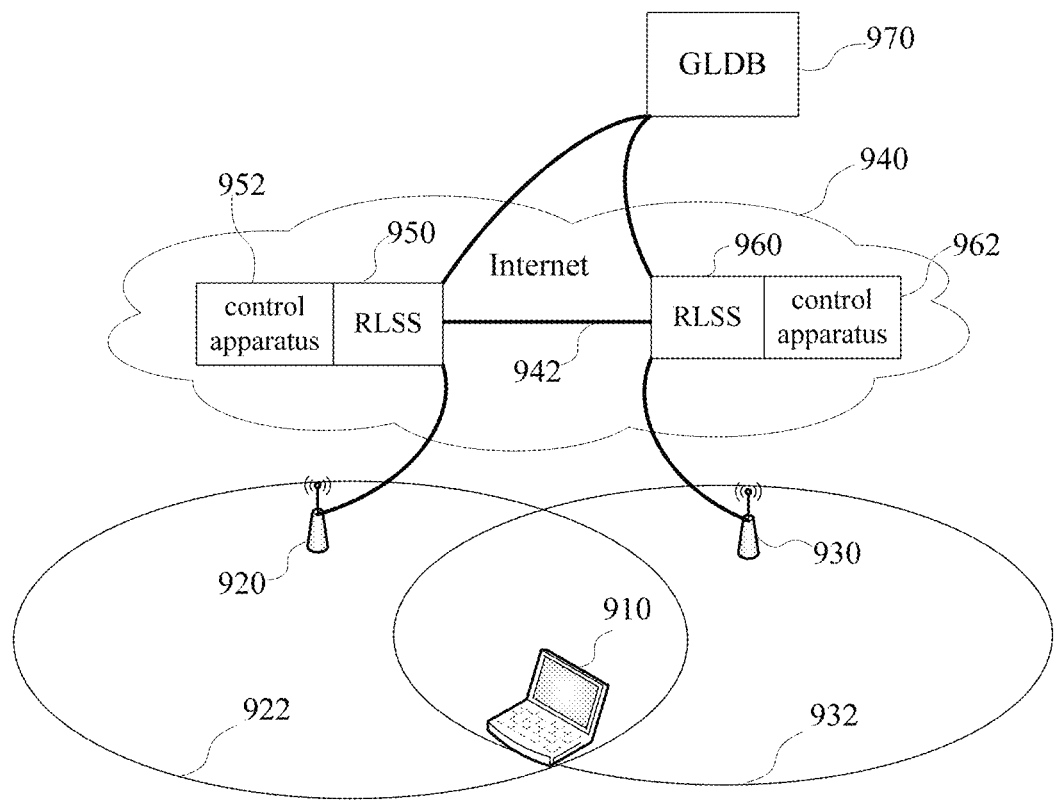
FIG. 9 is a schematic diagram illustrating a wireless communication system supporting cognitive radio according to another embodiment of the present disclosure.

As shown in FIG. 9, in a wireless communication system based on WiFi, a cognitive radio apparatus 910 is within the cover ranges (which are respectively indicated by 922 and 923) of an access point 920 and an access point 930. In the shown example, the cognitive radio apparatus 910 is a portable computer. However, the cognitive radio apparatus 910 may be other cognitive radio apparatuses.

The access point 920 and the access point 930 are respectively connected to servers such as registered location security servers 950 and 960. Servers 950 and 960 are respectively provided with a control apparatus 952 and a control apparatus 962, which may have the configuration described above in conjunction with specific embodiments.

The access point 920 and the access point 930 may be connected to a spectrum allocation device such as a GLDB 970 via the server 950 and the server 960, and obtain available spectrum resources by transmitting access requests for spectrum resources to the GLDB 970. A link 942 may be provided between the server 950 and the server 960 for communication. With the link 942, the server 950 and the server 960 may exchange, for example, information such as GLDB access periods, and/or switch configurations, geographic locations, transmission powers, movement characteristics and the like of all (or only some) of communication apparatuses respectively managed by the server 950 and the server 960, in order to determine whether a communication apparatus managed by one of the server 950 and the server 960 is more suitable to be served by the other. For example, in a case that the server 950 determines in the manner described in the above embodiments that the cognitive radio apparatus 910 is more suitable to be served by the access point 930 managed by the server 960, a handoff request associated with the cognitive radio apparatus 910 is transmitted to the server 960 via the link 942, and node configuration information of the access point 930 transmitted by the server 960 is acquired, in order to perform a reconfiguration, including modification of a database access manner, on the cognitive radio apparatus 910.

The cognitive radio apparatus 910 may take one of the access point 920 and the access point 930 as the master apparatus for transmitting the access request for the spectrum resource to the GLDB 970.

The control apparatus 952 or 960 may instruct the cognitive radio apparatus 910 to change the master apparatus for the cognitive radio apparatus 910 in the manner described above, for example, according to the time configuration of the access request, such that, for example, the time configuration of the access request from the cognitive radio apparatus 910 is closer to the time configuration of the access request from the master apparatus for the cognitive radio apparatus 910, thus the access request from the cognitive radio apparatus 910 and the access request from the master apparatus for the cognitive radio apparatus 910 can be transmitted to the GLDB 970 as a single access request.

In the following, a specific example of communication between the cognitive radio apparatus, which is shown in the drawings as a Cognitive Radio System (CRS), and the control apparatus according to the embodiments of the present disclosure, which is shown in the drawings as a Spectrum Coordinator (SC) is described with reference to FIGS. 10 and 11.

Figure 10:
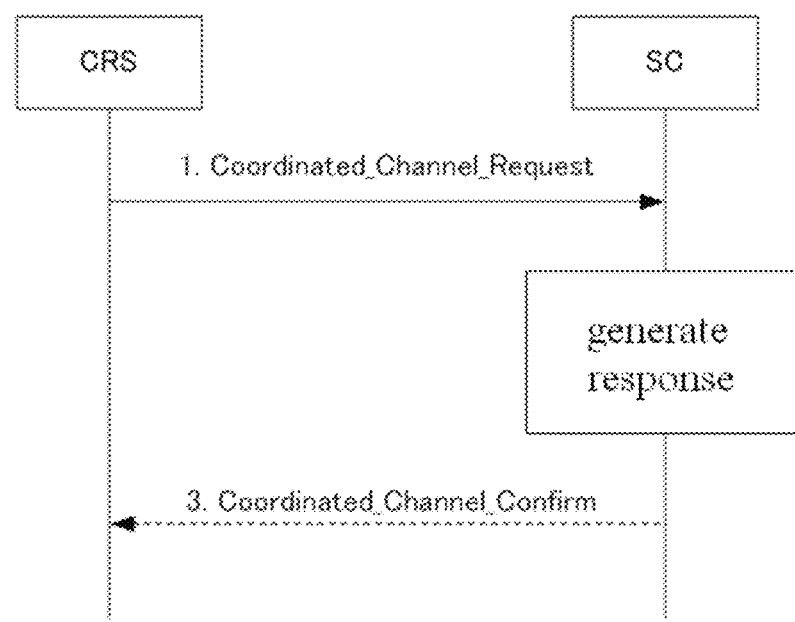
FIGS. 10 and 11 are schematic diagrams for illustrating a communication between a cognitive radio apparatus and a control apparatus according to an embodiment of the present disclosure.

As shown in FIG. 10, the CRS transmit a coordinated_channel_request command for requesting a coordinated channel resource to the SC, the command may include function information of the CRS, Which includes, for example, information on whether the GLBD may be accessed to via another CRS, an IP address of the CRS, and the like. The SC responds to the command and transmits a coordinated_channel_Confirm command for confirming the above request, thereby establishing a connection.

For example, the function information of the CRS may be indicated by the following exemplary pseudo code, where -- indicate annotations:

```
--Device capacity
    DeviceCapability ::= SEQUENCE{
    --The number of antennas at the requesting CRS
                numberOfAntennas         INTEGER
    --Capability to access GLDB via another CRS. 0 unable to access
GLDB via another CRS; 1 able to access GLDB via another CRS.
                accessRoutingEnabled   BOOLEAN
    --Routing information for accessing GLDB
                routeCRS OCTET STRING
    --Priority access of the CRS
                priority AccessTrue BOOLEAN
    --expected QoS of priority access
                expectedQoS    QoS
```

Figure 11:
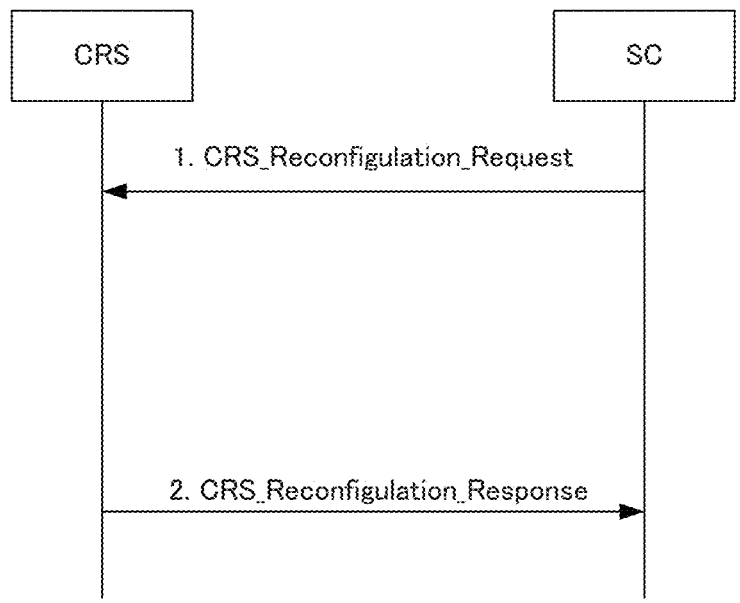

As shown in FIG. 11, in a case that the SC requires the CRS to be reconfigured, for example, an access routing and a time configuration of the access request to be adjusted, the SC may transmit a reconfiguration request command CRS_Reconfiguration_Request to the CRS. The CRS performs reconfiguration according to the command and transmits a reconfiguration response command CRS_Reconfiguraiton_Response to the SC.

The routing information and/or the time configuration information of the access request to be updated may be added into the reconfiguration request.

For example, CRS reconfiguration information may be indicated by the following exemplary pseudo code:

```
--GLDB access routing and timing information
    accessTiming         accessTiming
--Routing information for accessing GLDB
                routeCRS OCTET STRING,
    where the time information is defined as follows:
DatabaseAccessTiming ::= SEQUENCE{
            --start time of GLDB access in UTC
            startTime          UTCTime
            --Update timer [seconds]
            updateTimer   REAL,
}
```

Figure 14:
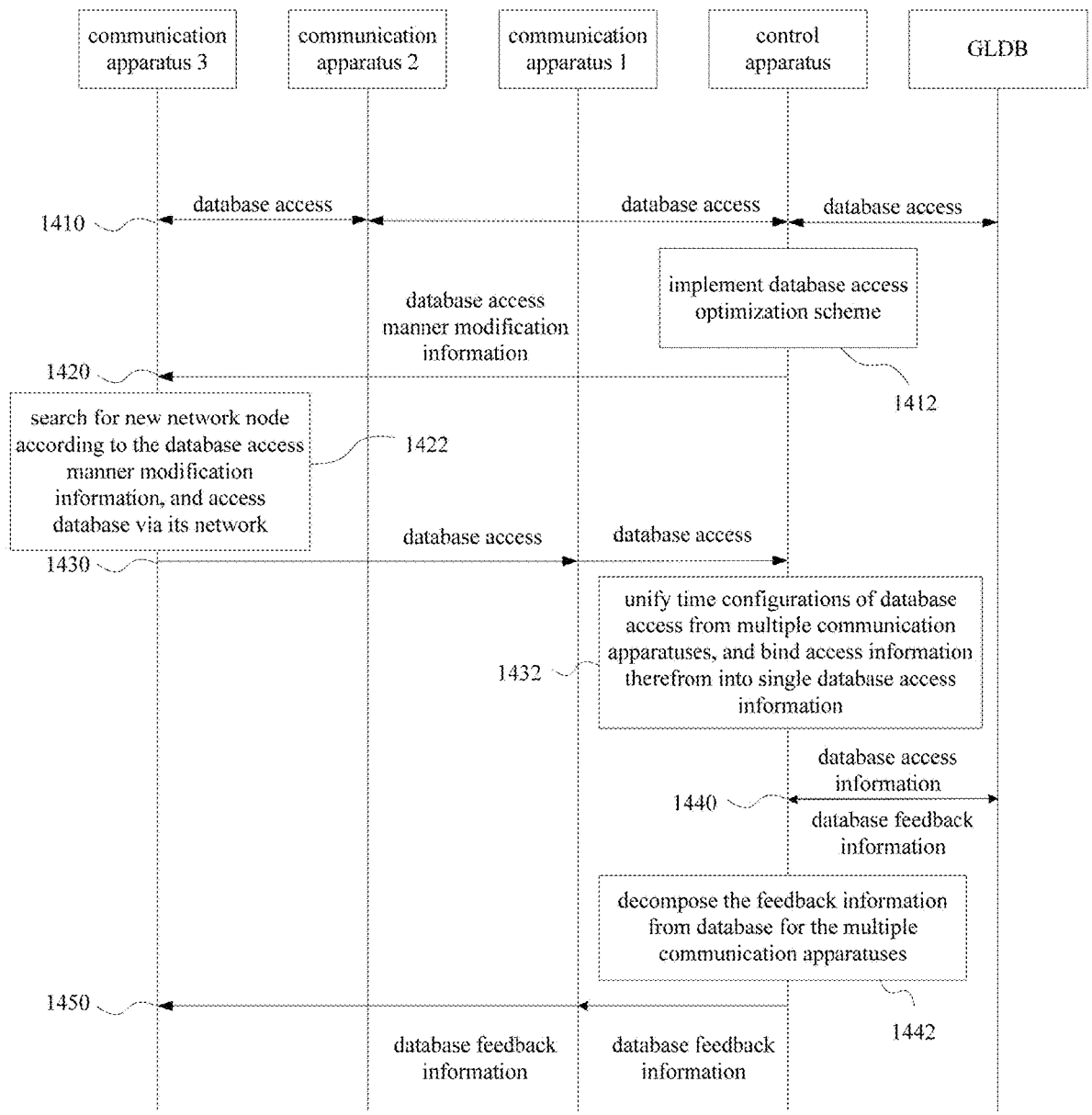
FIG. 14 is a schematic diagram for illustrating an exemplary process of the information interaction between the communication apparatus, the control apparatus and the GLDB according to embodiments of the present disclosure.

Next, an example process of information interaction between the communication apparatus, the control apparatus and the GLDB according to an embodiment of the present disclosure is described with reference to FIG. 14. Here, the GLDB is an example of the spectrum allocation device in the above embodiments.

In 1410, a communication apparatus 3 accesses a network of a communication apparatus 2 for using a spectrum granted to a primary system as a secondary system, and accesses the control apparatus via the communication apparatus 2. Then, the control apparatus exchanges a database access information with the GLDB. At this time, the communication apparatus 2 also performs information exchange with the GLDB for using the spectrum granted to the primary system as the secondary system. For example, the communication apparatus 2 transmits a geographic location and then acquires an available spectrum resource. During this process, the communication apparatus informs the control apparatus whether the communication apparatus accesses the GLDB via other nodes using a spectrum which in not granted to the communication apparatus. In this case, the communication apparatus 2 is the master apparatus, while the communication apparatus 3 acts as the slave apparatus. That is, the communication apparatus 3 acts as a slave apparatus when connecting to the network of the communication apparatus 2. When the communication apparatus 3 accesses the database to acquire an available spectrum resource, and uses the available spectrum resource to establish a new network, the communication apparatus 3 becomes a master apparatus of the network thereof. This mode is referred to as a bootstrap mood. Therefore, the communication apparatus, when accessing the data, shall inform the control apparatus of whether the communication apparatus is connected to the database as a slave apparatus via another apparatus. For example, this information may be indicated by the communication apparatus setting a bootstrap-mode identifier. If the communication apparatus is connected to the database as a slave apparatus via another apparatus, the communication apparatus may provide information of the node to which the communication apparatus accesses, such as an IP address, a MAC address or physical cell ID (PCI) in LIE.

In 1412, the control apparatus determines an optimization scheme for the communication apparatus 3 to access the GLDB, for example, according the above embodiments.

In 1420, the control apparatus informs the communication apparatus 3 of optimized database access routing information. For example, in a case that the communication apparatus 2 is an LTE network apparatus, such as an eNB, the communication apparatus 2 may transmits the information to the communication apparatus 3, such as an LIE, which acts as the slave apparatus thereof, as data information or neighboring node information in a System Information Block (SIB), for example. In addition, the information may also be transmitted as control information in a signaling such as a PDCCH, ePDCCH or the like. The information may be an identification of another communication apparatus, for example, a physical cell ID of an eNB, or may be an IP address, a MAC address in a WiFi network. Further, the information may further include coordinated database access time configuration information such as period information.

In 1422, the communication apparatus 3 searches for a specified network for connection according to a received database access modification information. For example, in this example, it is determined by the optimization scheme that the communication apparatus 3 is connected to the control apparatus via the network of the communication apparatus 1, and accesses the database via the control apparatus. Each of the communication apparatuses 1, 2 and 3 may access the database via the control apparatus.

In 1430, the communication apparatus 3 is connected to the control apparatus via the network of the communication apparatus 1, and accesses the database via the control apparatus.

In 1432, the control apparatus may merge the database access information from the communication apparatus 1 and the communication apparatus 2 in to a single database access information carrying two geographic location parameters and parameters of two communication apparatuses, rather than two separate pieces of database access information. In 1440, the GLDB is accessed with a single access request.

After reception of feedback information from the database, in 1442, the control apparatus parses the feedback information from the database and extracts available spectrum resource information for multiple communication systems, and transmit the available spectrum resource information to respective communication apparatuses in 1450.

Figure 15:
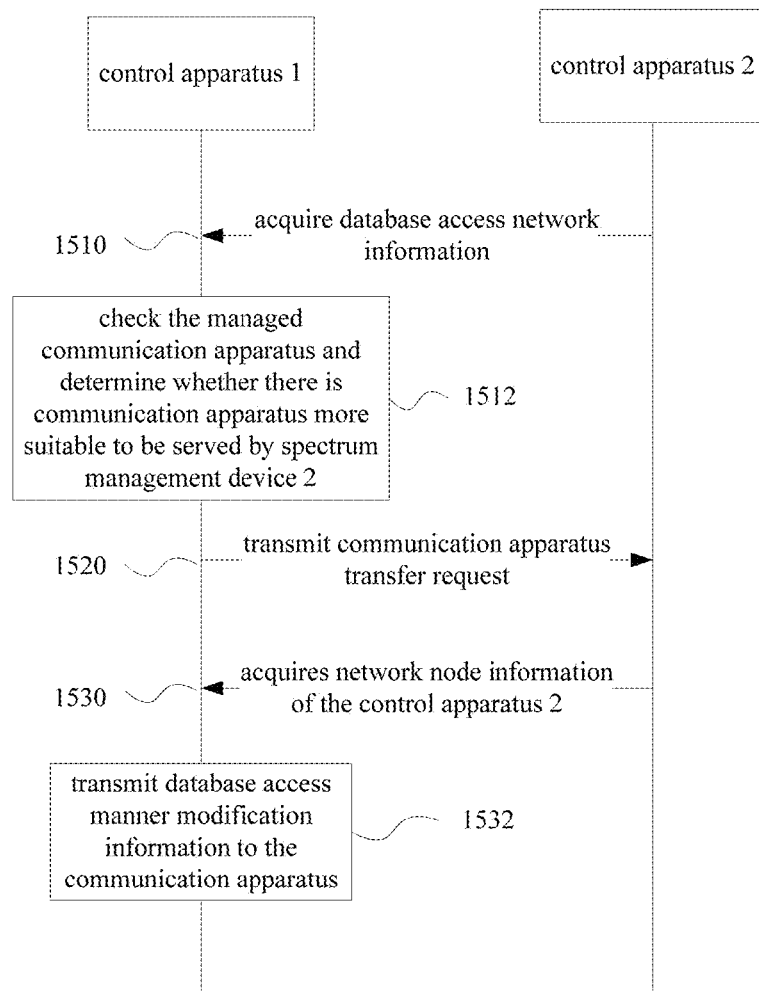
FIG. 15 is a schematic diagram for illustrating an exemplary process of the information interaction between the control apparatuses according to the embodiments of the present disclosure.

During the above process, if there are multiple control apparatuses managing different communication apparatuses in a certain area, the control apparatuses may exchange data with each other thereby transferring management of a communication apparatus. FIG. 15 is a schematic diagram illustrating an exemplary process of the information interaction between control apparatuses according to an embodiment of the present disclosure.

In 1510, the control apparatus acquires database access network information, which varies according to optimization schemes adopted by the control apparatus. For example, if the principle that the periods of access requests are to be as consistent as possible is followed, the database access network information includes information on GLOB access periods supported by the control apparatus 2. Alternatively, if the principle based on movement characteristics is followed, information on the movement of the communication apparatus is provided.

In 1512, the control apparatus 1 determines whether there is a communication apparatus managed by the control apparatus 1 which is more suitable for the control apparatus 2. For example, the database access period of a certain communication apparatus is closer to the database access period of the communication apparatus managed by the control apparatus 2.

In a case that a management needs to be transferred, in 1520, the control apparatus 1 transmits a communication system transfer request to the control apparatus 2.

If the control apparatus 2 accepts this request, in 1530, network node information of the control apparatus 2 such as a cell ID or a MAC address of a cell base station is transmitted.

After reception of the network node information, in 1532, the information is transmitted to the communication apparatus Which need a handover.

Besides the above embodiments, various electronic apparatuses for wireless communication system supporting cognitive radio are further provided according to the embodiments of the present disclosure. The electronic apparatus includes circuits or one or more processors configured to perform various operations described in the above specific embodiments. For example, an electronic apparatus for wireless communication system supporting cognitive radio includes circuits or one or more processors configured to: acquire information on at least one factor which can influence transmission performance of an access request for a spectrum resource from a communication apparatus, the access request being used for requesting a device for controlling spectrum allocation to allocate a spectrum to the communication apparatus; and receive the access request transmitted by the communication apparatus, and perform optimization on a routing of the access request from the communication apparatus according to the acquired factor in a case that the access request contains information indicating that the communication apparatus is a slave apparatus for another communication apparatus.

It is further provided an electronic apparatus for wireless communication system supporting cognitive radio according to the embodiments of the present disclosure, which includes circuits or one or more processors configured to: receive an access request for a spectrum resource from a first cognitive radio apparatus: and parse an apparatus parameter of the first cognitive radio apparatus to determine routing information of the access request from the first cognitive radio apparatus, and provide available spectrum resource information for the first cognitive radio apparatus in response to the access request and on the basis of the routing information, where the routing information corresponds to a second cognitive radio apparatus, and the first cognitive radio apparatus is capable of communicating with the second cognitive radio apparatus using a spectrum resource available to the second cognitive radio apparatus.

It is further provided an electronic apparatus for wireless communication system supporting cognitive radio according to the embodiments of the present disclosure, which includes circuits or one or more processors configured to: receive access requests for spectrum resources from multiple cognitive radio apparatuses; and merge, based on time characteristics of the access requests for spectrum resources from the multiple cognitive radio apparatuses, corresponding multiple access requests into a single access request, and control the communication unit to transmit the single access request to a device for controlling spectrum allocation, so as to allocate spectrum resources to the multiple radio apparatuses.

As an example, various steps of the above methods and various components and/or units of the above device may be implemented in software, firmware, hardware or a combination thereof. In a case of implementing in software or firmware, a program of a software for implementing the above methods may be installed from a storage medium or a network to a computer (such as the general-purpose computer 1200 shown in FIG. 12) having dedicated hardware. The computer can perform various functions if installed with various programs.

Figure 12:
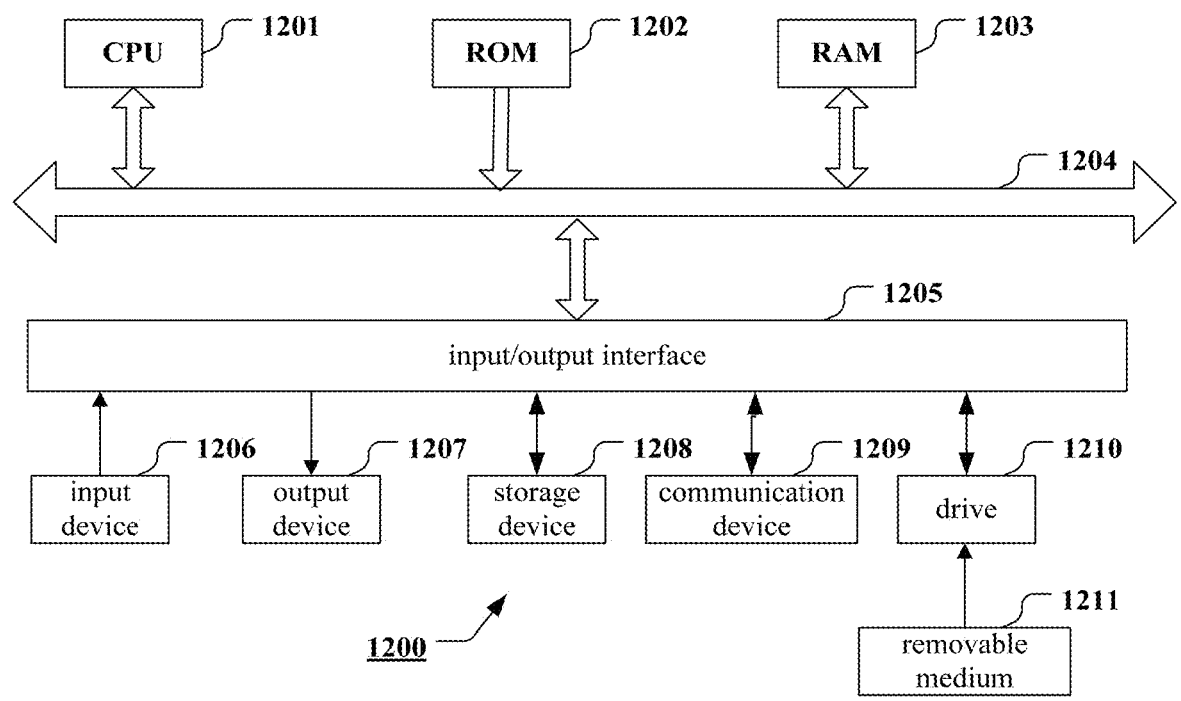
FIG. 12 is a block diagram illustrating an example of a schematic configuration of a computer to which the technology of the present disclosure may be applied.

In FIG. 12, a computation processing unit a CPU) 1201 executes various processing according to a program stored in a Read Only Memory (ROM) 1202 or a program loaded to a Random Access Memory (RAM) 1203 from a storage device 1208. In the RAM 1203, if necessary, data required for the CPU 1201 in executing various processing and the like is also stored. The CPU 1201, the ROM 1202 and the RAM 1203 are linked to each other via a bus 1204. An input/output interface 1205 is also linked to the bus 1204.

The following components are linked to the input/output interface 1205: an input device 1206 including a keyboard, a mouse and the like, an output device 1207 including a display such as a Cathode Ray Tube (CRT) and a Liquid Crystal Display (LCD), a speaker and the like, the storage device 1208 such as a hard disk and the like, and a communication device 1209 such as a network interface card like a LAN card, a modem and the like. The communication device 1209 performs communication processing via a network such as the Internet. If necessary, a drive 1210 can also be linked to the input/output interface 1205. A removable medium 1211 such as a magnetic disk, an optical disk, a magneto-optical disk, a semiconductor memory and the like is mounted on the drive 1210 as required such that a computer program read out therefrom is installed in the storage device 1208 as required.

In a case that the series of processing above is implemented in software, a program constituting the software is installed from the network such as the Internet or the storage medium such as the removable medium 1211.

Figure 13:
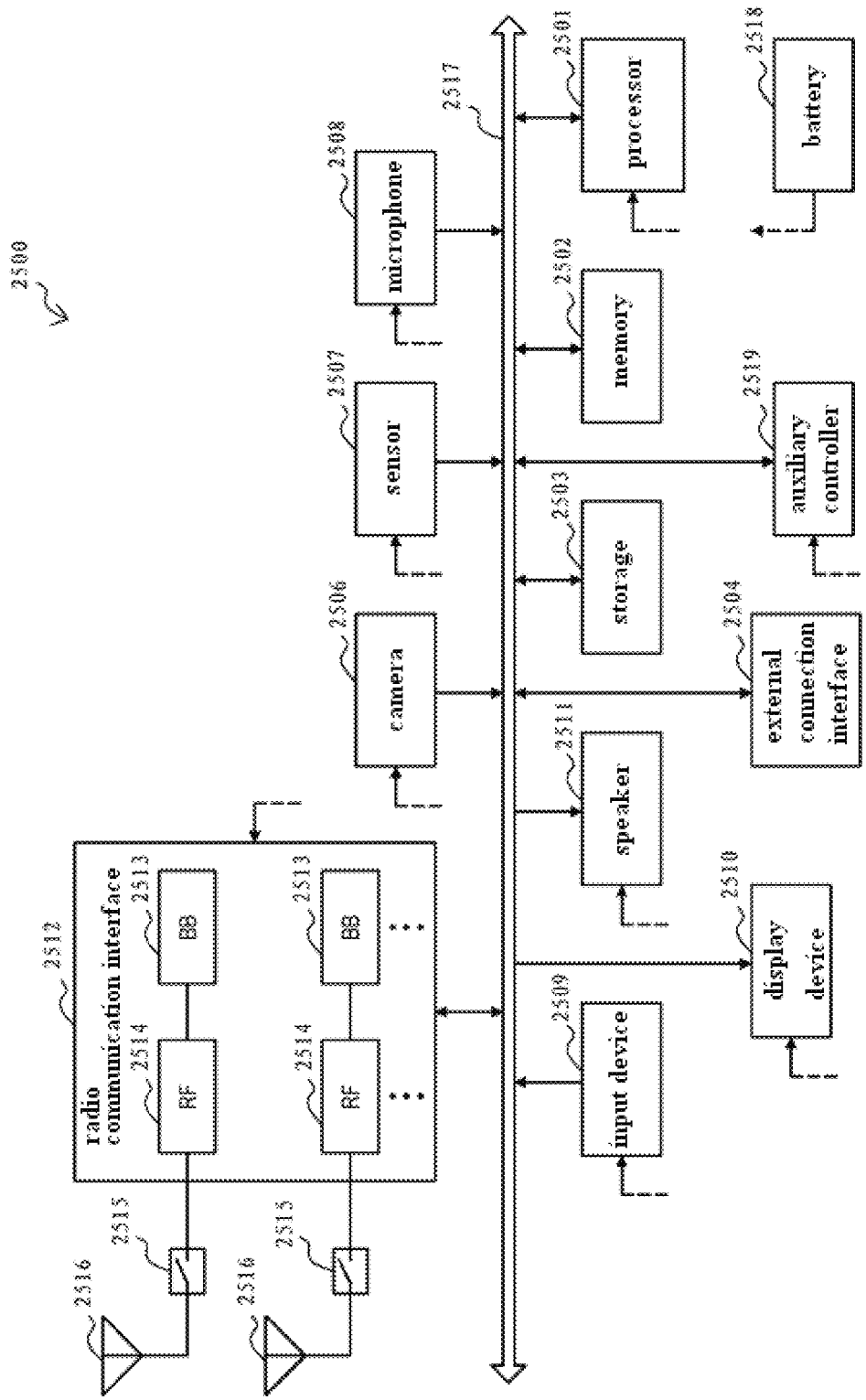
FIG. 13 is a block diagram illustrating an example of a schematic configuration of a smartphone to which the technology of the present disclosure may be applied.

It is understood by those skilled in the art that the storage medium is not limited to the removable medium 1211 shown in FIG. 13 in which the program is stored and which is distributed separately from the device so as to provide the program to the user. Examples of the removable medium 1211 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 1202, the hard disk contained in the storage device 1208 or the like. Herein, the program is stored in the storage medium, and the storage medium is distributed to the user together with the device containing the storage medium.

Embodiments of the present disclosure also relates to a program product on which machine-readable instruction codes are stored. The instruction codes can perform the methods according to the above embodiment when read and executed by a machine.

Accordingly, the present disclosure also includes storage medium carrying the program product on which the machine-readable instruction codes are stored. The storage media includes a soft-disk, an optical disk, a magnetic disk, a storage card, a storage stick and the like, but is not limited thereto.

The embodiments of the present disclosure also relates to the following electronic apparatus. When applied on a side of a base station, the electronic apparatus may be realized as any type of evolved Node B (eNB) such as a macro eNB and a small eNB. The small eNB may be an eNB such as a pico eNB, a micro eNB, and a home (femto) eNB that covers a cell smaller than a macro cell. Alternatively, the electronic apparatus may be realized as any other types of base stations such as a NodeB and a base transceiver station (BTS). The electronic apparatus may include a main body (that is also referred to as a base station apparatus) configured to control radio communication, and one or more remote radio heads (RRH) disposed in a different place from the main body. In addition, various types of terminals, which will be described below, may each serves as the base station by temporarily or semi-persistently executing a base station function.

In a case of being applied on a side of a user equipment, the electronic apparatus may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. Furthermore, the electronic apparatus may be a radio communication module (such as an integrated circuit module including a single wafer or multiple wafers) mounted on each of the terminals.

FIG. 13 is a block diagram illustrating an example of a schematic configuration of a smartphone 2500 to which the technology of the present disclosure may be applied. The smartphone 2500 includes a processor 2501, a memory 2502, a storage 2503, an external connection interface 2504, a camera 2506, a sensor 2507, a microphone 2508, an input device 2509, a display device 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external device such as a memory card and a universal serial bus (USB) device to the smartphone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smartphone 2500 to audio signals. The input device 2509 includes, for example, a touch sensor configured to detect touch onto a screen of the display device 2510, a keypad, a keyboard, a button, or a switch, and receives an operation or an information input from a user. The display device 2510 includes a screen such as a liquid crystal display (LCD) and an organic light-emitting diode (OLED) display, and displays an output image of the smartphone 2500. The speaker 2511 converts audio signals that are output from the smartphone 2500 to sounds.

The radio communication interface 2512 supports any cellular communication scheme such as LET and LTE Advanced, and performs radio communication. The radio communication interface 2512 may typically include, for example, a BB processor 2513 and alt RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a one chip module having the BB processor 2513 and the RF circuit 2514 integrated thereon. The radio communication interface 2512 may include the multiple 1313 processors 2513 and the multiple RF circuits 2514, as illustrated in FIG. 13. Although FIG. 13 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance wireless communication scheme, a near field communication scheme, and a radio local area network (LAN) scheme. In that case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smartphone 2500 may include the multiple antennas 2516, as illustrated in FIG. 13. Although FIG. 13 illustrates the example in which the smartphone 2500 includes the multiple antennas 2516, the smartphone 2500 may also include a single antenna 2516.

Furthermore, the smartphone 2500 may include the antenna 2516 for each radio communication scheme. In that case, the antenna switches 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the radio communication interface 2512, and the auxiliary controller 2519 to each other. The battery 2518 supplies power to blocks of the smartphone 900 illustrated in FIG. 13 via feeder lines, which are partially shown as dashed lines in the figure. The auxiliary controller 2519 operates a minimum necessary function of the smartphone 2500, for example, in a sleep mode.

In the above description of embodiments of the present disclosure, a feature described and/or illustrated in an embodiment may be applied to one or more other embodiments in a same or similar manner, or max be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units, Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosure by describing the above embodiment of the present disclosure, it should be noted that each of the above example and embodiment is not for limiting but for illustrating. Those skilled in the art may make various modifications, improvements and equivalents within the spirit and scope of the appended claims. The modifications, improvements and equivalents should also be included in the protection scope of the present disclosure.

The invention claimed is:

1. An apparatus for a wireless communication system, comprising:
a processing circuitry configured to:
receive an access request for a spectrum resource from a first apparatus managed by the apparatus, wherein the access request comprises an indication that the first apparatus is a slave of a second apparatus;
parse an apparatus parameter of the first apparatus to determine routing information of the access request from the first apparatus, wherein the routing information identifies the second apparatus; and
provide available spectrum resource information about an available spectrum resource for the first apparatus in response to the access request and on the basis of the routing information,
wherein the first apparatus is capable of communicating with the second apparatus using the available spectrum resource.

2. The apparatus according to claim 1, wherein the processing circuitry is further configured to transmit a reconfiguration request to the first apparatus, wherein the reconfiguration request comprises routing information or a time configuration of the access request.

3. The apparatus according to claim 1, wherein the processing circuitry is further configured to determine a third apparatus based on a time characteristic of the access request for the spectrum resource from the first apparatus, the specified routing information corresponding to the third apparatus.

4. The apparatus according to claim 1, wherein the processing circuitry is further configured to determine a third apparatus based on mobility information of the first apparatus, the specified routing information corresponding to the third apparatus.

5. The apparatus according to claim 1, wherein the processing circuitry is further configured to determine the specified time configuration of the access request based on a time characteristic of the access request for the spectrum resource from the apparatus corresponding to the routing information.

6. The apparatus according to claim 1, wherein the processing circuitry is further configured to,
merge access requests for a plurality of spectrum resources respectively from the first apparatus and another apparatus into a single access request, and
transmit the single access request to a device for controlling spectrum allocation, so as to provide the available spectrum resource information for the first apparatus and the another apparatus.

7. The apparatus according to claim 1, wherein the processing circuitry is further configured to include, in available spectrum resource indication message for the second apparatus, the available spectrum resource information for the first apparatus.

8. The apparatus according to claim 1, wherein the access request comprises the apparatus parameter of the first apparatus.

9. The apparatus according to claim 1, wherein the processing circuitry is further configured to determine the available spectrum resource information based on geographic location information of the first apparatus.

10. The apparatus according to claim 9, wherein the access request comprises the geographic location information of the first apparatus.

11. A method for a wireless communication system, comprising:
- receiving an access request for a spectrum resource from a first apparatus, wherein the access request comprises an indication that the first apparatus is a slave of a second apparatus;
- parsing an apparatus parameter of the first apparatus to determine routing information of the access request from the first apparatus, wherein the routing information identifies the second apparatus; and
- providing available spectrum resource information about an available spectrum resource for the first apparatus in response to the access request and on the basis of the routing information,
- wherein the first apparatus is capable of communicating with the second apparatus using the available spectrum resource.

* * * * *